United States Patent [19]
Ukai

[11] 3,733,583
[45] May 15, 1973

[54] INDICATOR LAMP SUPPORT APPARATUS FOR A MOTORIZED TWO WHEEL VEHICLE

[75] Inventor: Kiyoshi Ukai, Iruma-gun, Saitama, Japan

[73] Assignee: Honda Giken Kogyo Kabushiki Kaisha, Tokyo, Japan

[22] Filed: Nov. 4, 1971

[21] Appl. No.: 195,626

[30] Foreign Application Priority Data

Nov. 26, 1970 Japan..............................45/117611

[52] U.S. Cl..........240/7.1 R, 240/7.55, 240/10.6 SD, 240/52.1, 240/58
[51] Int. Cl..............................B60q 1/00, B60q 3/00
[58] Field of Search................240/2 E, 7.1 F, 7.1 G, 240/7.55, 10.6 SD, 52, 52.1, 58

[56] References Cited

UNITED STATES PATENTS 3,524,979   8/1970   Cohen............................240/7.55 X

FOREIGN PATENTS OR APPLICATIONS 1,030,023   3/1953   France................................240/7.55
  731,722   6/1955   Great Britain........................240/7.55

*Primary Examiner*—Samuel S. Matthews
*Assistant Examiner*—Richard A. Wintercorn
*Attorney*—Eric H. Waters

[57] ABSTRACT

Indicator lights for the operating condition of various parts of a motorized two-wheel vehicle are provided at the flat upper surface of a support assembly for a steering handle of the vehicle. The support assembly comprises a lower member fixed to the front fork of the vehicle and an upper member detachably connected to the lower member. The flat surface is formed on the upper portion of the upper member and lamp assemblies for the lights are mounted in tubular holders attached to the upper member below apertures in the upper member through which the condition of the lamps is visible to the driver.

5 Claims, 2 Drawing Figures

INVENTOR
Kiyoshi Ukai
BY

INDICATOR LAMP SUPPORT APPARATUS FOR A MOTORIZED TWO WHEEL VEHICLE

BRIEF SUMMARY OF THE INVENTION

The invention relates to indicator lights for indicating the condition of operation of various parts of a motorized two-wheel vehicle and more particularly to the support arrangement of such indicator lights.

An object of the invention is to provide a support arrangement for such indicator lights so that they can be readily scanned by the driver.

A further object of the invention is to provide a support arrangement in which maintenance and inspection of the lamps of the indicator lights can be easily effected.

According to the invention, a steering handle of the vehicle is supported by a support means attached to the front fork of the vehicle, and an upper portion of the support means is formed with a flat surface facing upwardly, the support means having apertures in the flat surface through which are visible indicator lights for the operation condition of various parts of the vehicle.

In further accordance with the invention, the support means is composed of detachably connected upper and lower support members which clamp the steering handle, the flat surface being formed on the upper support member.

The upper support member carries depending tubular members below the apertures, and the indicator lights are mounted in the tubular members.

A wall extends upwardly on the upper support member at the front and sides of the flat surface to aid in examination of the operating state of the lights.

DETAILED DESCRIPTION

Numeral 1 denotes a lower supporting member adapted to be secured to the top end of a front fork (not shown) of a two-wheel vehicle, and numeral 2 denotes an upper supporting member fastened to the lower supporting member by means of bolts 3.

Figure 1:
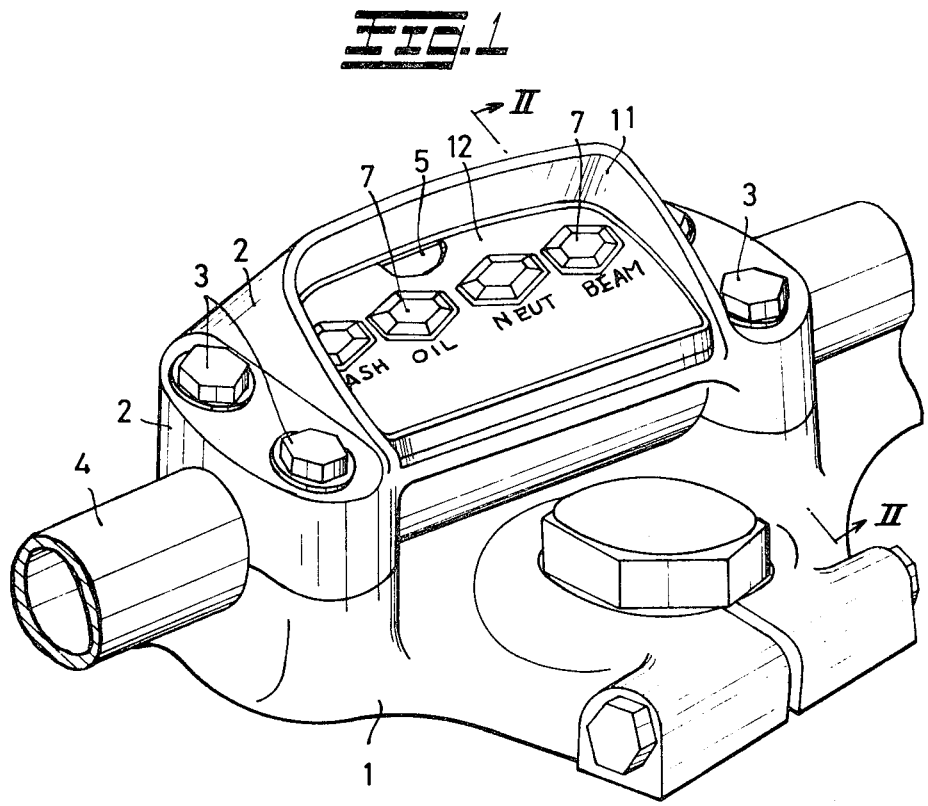
FIG. 1 is a perspective view, partly broken away, of an apparatus according to this invention.
Figure 2:
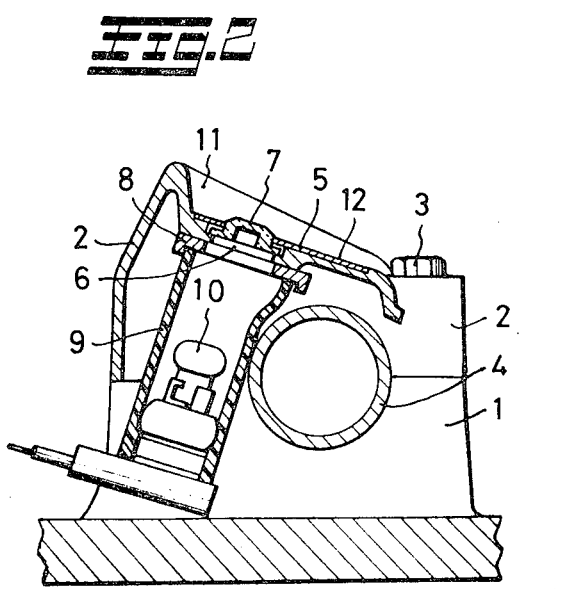
FIG. 2 is a sectional view taken along the line II — II in FIG. 1.

A steering handle 4 is clamped between the two supporting members 1, 2. A flat portion 5 is formed on the upper portion of the upper supporting member 2 and several openings 6 (FIG. 2) are formed therein. Respective lenses 7 are mounted above the openings 6. The flat portion 5 is tilted slightly upwardly to face the driver for a reason to become apparent hereafter. An attaching plate 8 is mounted at the underside of the flat portion 5 and respective tubular members 9 are secured at their upper ends to the attaching plate 8 so as to be positioned below the corresponding openings 6.

An indication lamp 10 showing the operating condition of a selected part of the motorized two-wheel vehicle is mounted in each tubular body. Such indication lamps may be a headlight change-over indication lamp, a change speed (neutral) indication lamp, a fuel quantity indication lamp or the like. Numeral 11 denotes a wall plate surrounding the front, right and left sides of the flat portion 5, and numeral 12 denotes an indication plate affixed on the flat portion 5. The wall plate 11 intercepts exterior light and facilitates the examination of the lenses 7. The wall plate 11 also serves to protact the lenses against damage.

Thus, according to this invention, the upper supporting member 2 of the two part handle-supporting assembly is utilized to form the flat portion 5, and the indication lenses 7 illuminated by the respective indication lamps 10 are mounted in the openings 6 of the flat portion 5, so that the lenses 7 become located in front of the driver and examination thereof is easy. Additionally, the maintenance and inspection of the indication lamps 10 can be easily effected by removing the upper supporting portion 2.

Although the invention has been described above in relation to a specific embodiment, it will become apparent to those skilled in the art that various modifications and variations can be made without departing from the scope and spirit of the invention as defined in the appended claims.

What is claimed is:

1. For a motorized two-wheel vehicle: support means for a steering handle, said support means comprising upper and lower detachably connected support members clampingly embracing the steering handle to form an integral turnable assembly therewith, said upper support member having an upper portion with a flat surface tilted forwardly and facing upwardly, lamp means for indicating an operating condition of the vehicle, a depending member secured to the upper support member, said lamp means being disposed in said depending member, said upper portion being provided with an aperture in said flat surface through which said lamp means is visible, and an upwardly extending wall on said upper support member surrounding the flat surface at the front and the sides thereof.

2. The combination as claimed in claim 1 comprising a lens covering said opening.

3. The combination as claimed in claim 2 comprising an indication plate on said flat surface.

4. The combination as claimed in claim 1 wherein said lamp means comprises a plurality of lamps each supported in a respective depending member attached to the upper support member and visible through a respective aperture.

5. The combination as claimed in claim 1 wherein said depending member is tubular.

* * * * *